(12) United States Patent
Kim et al.

(10) Patent No.: US 10,977,819 B2
(45) Date of Patent: Apr. 13, 2021

(54) ELECTRONIC DEVICE AND METHOD FOR RELIABILITY-BASED OBJECT RECOGNITION

(71) Applicant: Samsung Electronics Co., Ltd., Gyeonggi-do (KR)

(72) Inventors: Jaegon Kim, Gyeonggi-do (KR); Yongju Lee, Gyeonggi-do (KR); Nari Im, Gyeonggi-do (KR); Mincheol Hwang, Seoul (KR); Jiyoon Park, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 190 days.

(21) Appl. No.: 16/156,334

(22) Filed: Oct. 10, 2018

(65) Prior Publication Data

US 2019/0139256 A1 May 9, 2019

(30) Foreign Application Priority Data

Nov. 6, 2017 (KR) .......................... 10-2017-0146639

(51) Int. Cl.
*G06T 7/70* (2017.01)
*H04N 5/232* (2006.01)
(Continued)

(52) U.S. Cl.
CPC .............. *G06T 7/70* (2017.01); *G06F 3/0481* (2013.01); *G06K 9/00* (2013.01); *G10L 15/22* (2013.01);
(Continued)

(58) Field of Classification Search
None
See application file for complete search history.

(56) References Cited

U.S. PATENT DOCUMENTS 9,569,697 B1 2/2017 McNerney et al.
2002/0101513 A1* 8/2002 Halverson .............. H04N 5/772
348/207.99
(Continued)

FOREIGN PATENT DOCUMENTS

JP 2010108244 A * 5/2010
JP 2010-140315 A 6/2010
(Continued)

OTHER PUBLICATIONS

International Search Report dated Feb. 27, 2019.
(Continued)

*Primary Examiner* — Mohammed Rachedine
(74) *Attorney, Agent, or Firm* — Cha & Reiter, LLC

(57) ABSTRACT

According to embodiments, an electronic device comprising a processor configured to receive an image including one or more objects, acquire a first one or more of the received one or more objects, acquire one or more reliability measures associated with the acquired one or more first objects, receive an input including information having one or more words, acquire one or more second objects corresponding to at least a part of the one or more words, when there is at least one object corresponding to the one or more second objects among the one or more first object, adjust at least one reliability measure corresponding to the at least one object among the acquired one or more reliability measures, and recognize the one or more first objects by using an image recognition scheme at least based on the one or more reliabilities including the adjusted at least one reliability.

15 Claims, 7 Drawing Sheets

(51) Int. Cl.
*G06K 9/00* (2006.01)
*G06F 3/0481* (2013.01)
*G06F 3/0488* (2013.01)
*G10L 15/22* (2006.01)
*G10L 15/26* (2006.01)
*G06K 9/72* (2006.01)
*G06K 9/62* (2006.01)

(52) U.S. Cl.
CPC ..... *H04N 5/23229* (2013.01); *G06F 3/04883* (2013.01); *G10L 15/26* (2013.01)

(56) References Cited

U.S. PATENT DOCUMENTS

| | | | |
|---|---|---|---|
| 2009/0265165 A1* | 10/2009 | Apelqvist | G06F 16/58 704/201 |
| 2012/0301032 A1 | 11/2012 | Kawanishi et al. | |
| 2015/0234110 A1 | 8/2015 | Kim et al. | |
| 2015/0235110 A1* | 8/2015 | Curtis | G06K 9/00677 382/224 |

FOREIGN PATENT DOCUMENTS

| | | |
|---|---|---|
| JP | 5195291 B2 | 5/2013 |
| JP | 5426564 B2 | 2/2014 |
| KR | 10-2005-0071237 A | 7/2005 |
| KR | 10-0815291 B1 | 3/2008 |
| KR | 10-2016-0122452 A | 10/2016 |

OTHER PUBLICATIONS

Shibata et al.; "Automatic object model acquisition and object recognition by integrating linguistic and visual nformation"; Proceedings of the 15th International Conference on Multimedia 2007; Ausberg, Germany; Sep. 24-29, 2007; pp. 383-392; XP058405954.
Shiang et al; "Vision-Language Fusion for Object Recognition"; Feb. 12, 2017; XP055736522; http://www.cs.cmu.edu/afs/cs/cmu.edu/Web/People/srosenth/papers/RosenthalLAAAI17.pdf.
European Search Report dated Oct. 15, 2020.

* cited by examiner

ELECTRONIC DEVICE AND METHOD FOR RELIABILITY-BASED OBJECT RECOGNITION

CROSS-REFERENCE TO RELATED APPLICATION

This application is based on and claims priority under 35 U.S.C. § 119 to Korean Patent Application No. 10-2017-0146639, filed on Nov. 6, 2017, in the Korean Intellectual Property Office, the disclosure of which is incorporated by reference herein in its entirety.

TECHNICAL FIELD

The present disclosure relates to image processing method and device. More particularly, various embodiments of the present disclosure relate to an electronic device configured for improving an object recognition rate, and to an operation thereof.

BACKGROUND

Electronic devices are capable of identifying objects in images. Upon identifying an object in an image, the electronic device can enhance the appearance of the object. However, in view of the foregoing, it is important to have a high object recognition rate.

SUMMARY

Electronic devices are capable of processing an image by acquiring a raw image through an image sensor and processing the acquired raw image through an image signal processor (ISP). The ISP can process the raw image by using an image quality improvement algorithm, thus providing an image with improved quality. The ISP may perform various kinds of processing such as white balance adjustment, color adjustment (e.g., color matrix, color correction, color enhancement), color filter array interpolation, noise reduction processing or sharpening, or image enhancement (e.g., high-dynamic-range (HDR), face detection). An image outputted from the ISP may have, for example, a YUV format. Also, an image outputted from the ISP may be compressed, for example, using JPEG method, and the compressed image may be stored in an electronic device.

Meanwhile, an image processing cloud system is being used for image backup and new media content creation. In this system, an image may be uploaded to a cloud server, and a computer vision-based technique such as image matching that is difficult to perform in a client device may be applied to the uploaded image. Using machine learning based software, for example, the cloud server can perform image recognition.

An electronic device can recognize an object in an image by using a recognition algorithm acquired through machine learning or deep learning. Also, the electronic device can perform image processing through such object recognition and provide the processed image to the user. However, an error in object recognition may cause inaccuracy of image processing, for example, inaccurate editing of an object unlike a user's desire.

Various embodiments of the present disclosure provide an electronic device configured to improve the reliability of accurate object recognition and also provide a method for related operations.

According to various embodiments of the present disclosure, an electronic device comprising a processor configured to receive an image including one or more objects, acquire a first one or more of the received one or more objects, acquire one or more reliability measures associated with the acquired one or more first objects, receive an input including information having one or more words, acquire one or more second objects corresponding to at least a part of the one or more words, when there is at least one object corresponding to the one or more second objects among the one or more first object, adjust at least one reliability measure corresponding to the at least one object among the acquired one or more reliability measures, and recognize the one or more first objects by using an image recognition scheme at least based on the one or more reliabilities including the adjusted at least one reliability.

In another embodiment, there is presented an electronic device comprising a touch-sensitive display; an input device; a camera; a communication module; and a processor functionally connected to the touch-sensitive display, the input device, the camera, and the communication module, wherein the processor is configured to: acquire a first image through the camera, display a second image corresponding to the first image on the touch-sensitive display, acquire a user input through at least one of the touch-sensitive display or the input device while the second image is displayed, transmit the first image and the user input to the external electronic device through the communication module such that the external electronic device performs recognition of an object corresponding to the user input among objects of the first image, receive a result of the recognition from the external electronic device, acquire a first user input responsive to the result through at least one of the touch-sensitive display or the input device, and transmit the first user input to the external electronic device through the communication module such that the external electronic device adjusts a reliability associated with the object recognition, based on the first user input.

A method of operating an electronic device, the method comprising identifying an image including one or more objects; acquiring one or more first objects corresponding to at least a part of the one or more objects, and one or more reliabilities associated with recognition of the one or more first objects; acquiring an input including information having one or more words associated with the image; acquiring one or more second objects corresponding to at least a part of the one or more words; when there is at least one object corresponding to the one or more second objects among the one or more first objects, adjust at least one reliability corresponding to the at least one object among the one or more reliabilities; and recognize the one or more first objects by using an image recognition scheme at least based on the one or more reliabilities including the adjusted at least one reliability.

According to various embodiments of the present disclosure, the electronic device can improve the reliability of object recognition by performing the object recognition based on a user input.

DETAILED DESCRIPTION

In certain embodiments, a scheme for improving object recognition in images is presented. The image is captured by a camera and includes certain objects. The objects in the image are identified using an image recognition algorithm. The identified objects are also associated with reliability scores, wherein a higher reliability score indicates a higher confidence that the identified object, is in fact, an object. This is a first group of objects. A second group of objects can be acquired from a user input (e.g., a user's utterance) while displaying the image. When any object in the first group exists in the second group, the reliability for the object is improved.

Figure 1:
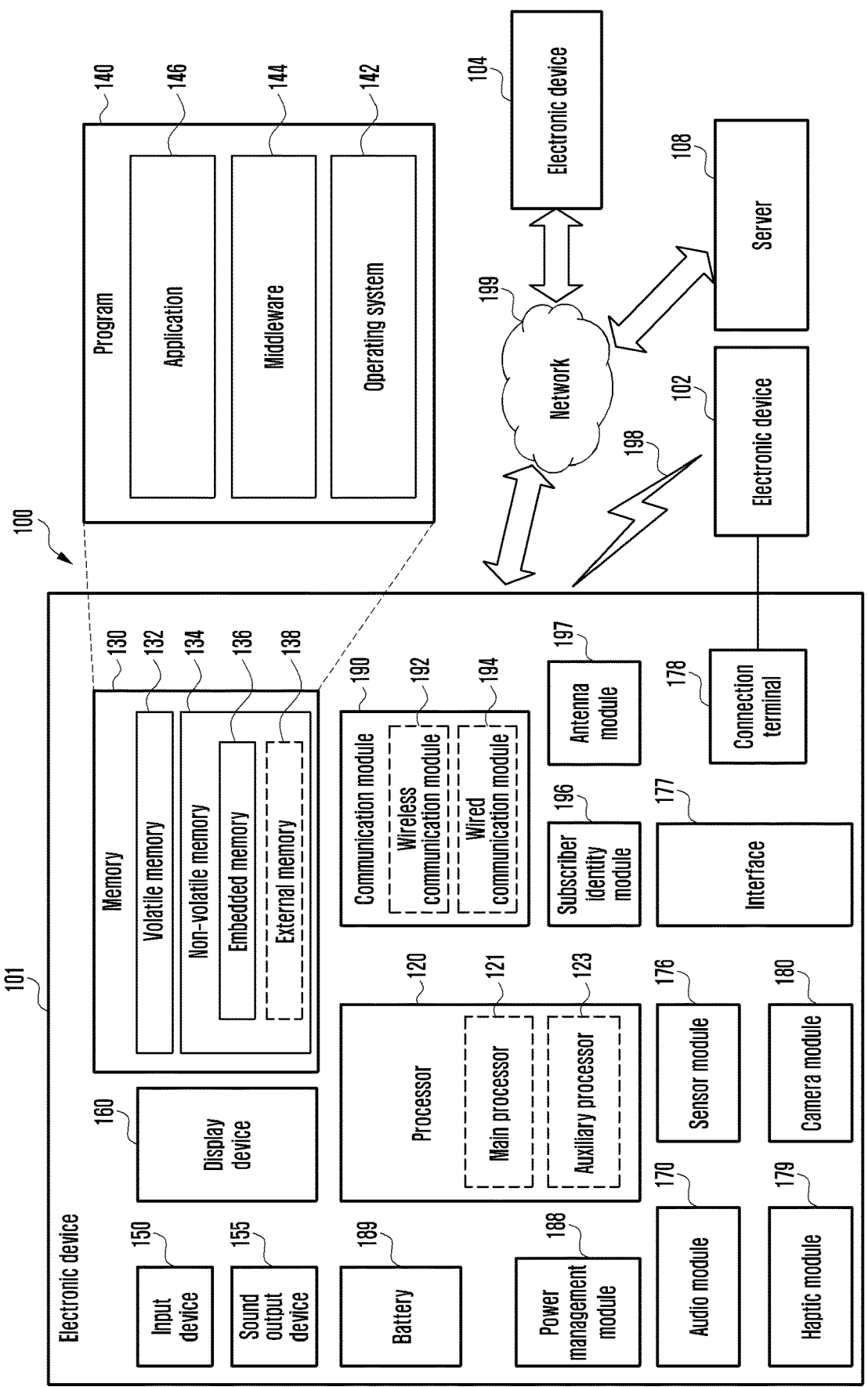
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
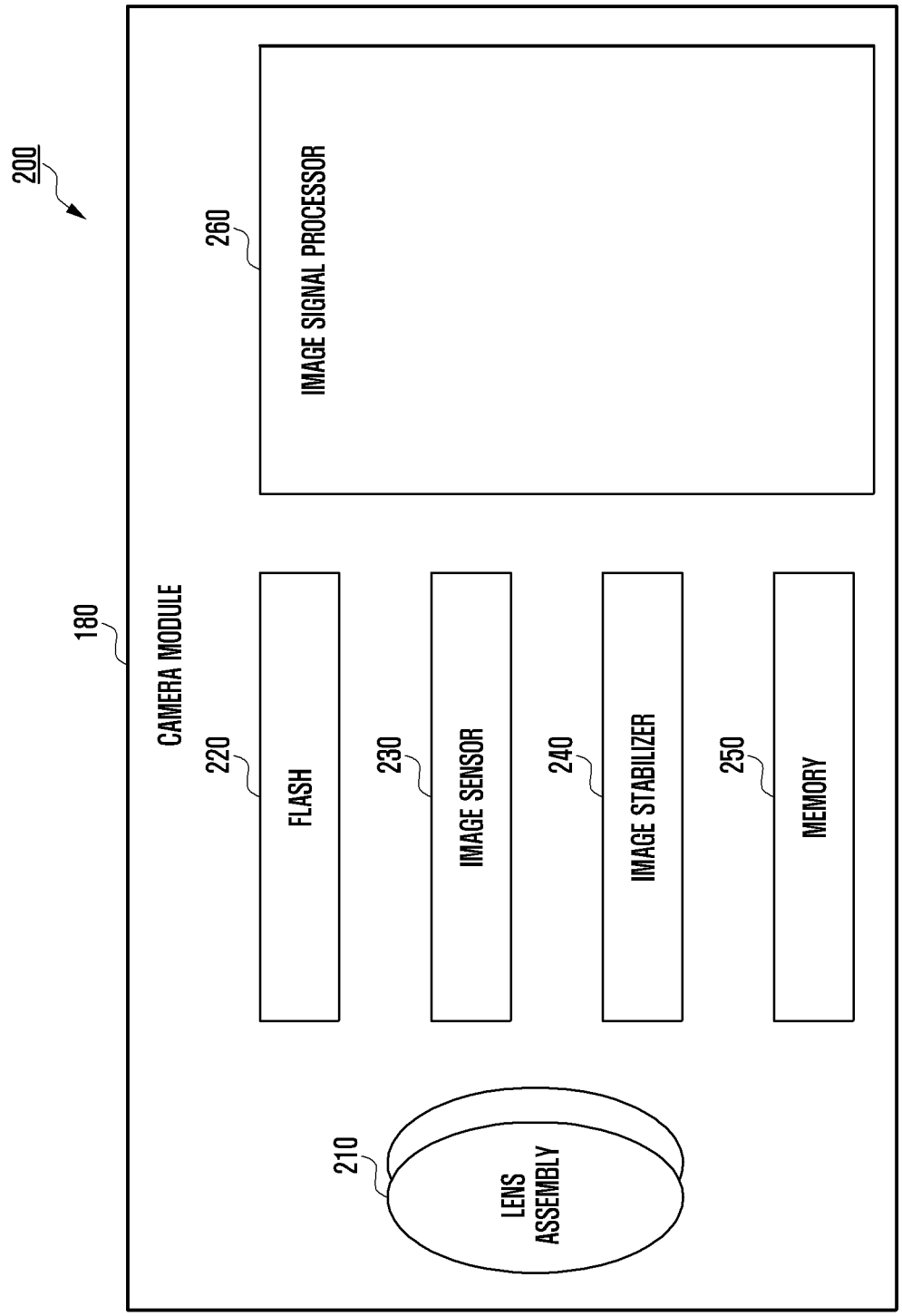
FIG. 2 is a block diagram illustrating a camera module according to various embodiments.

FIG. 2 is a block diagram 200 illustrating the camera module 180 according to various embodiments. Referring to FIG. 2, the camera module 180 may include a lens assembly 210, a flash 220, an image sensor 230, an image stabilizer 240, memory 250 (e.g., buffer memory), or an image signal processor 260.

The lens assembly 210 focuses the light emitted from a scene that is photographed. The flash 220 can be used to add light to the scene and enhance the light emitted from the scene. The image sensor 230 is the substrate that the images is captured on. The image stabilizer 240 corrects for jitter that often occurs when the camera 180 is held by hand. The memory 250 at least temporarily stores the captured image. The image signal processor 260 performs various functions that enhance the quality of the captured image.

According to an embodiment, the camera module 180 may include a plurality of lens assemblies 210. In such a case, the camera module 180 may form, for example, a dual camera, a 360-degree camera, or a spherical camera. The lens assembly 210 may collect light emitted or reflected from an object whose image is to be taken. The lens assembly 210 may include one or more lenses. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp.

The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer. This is particularly useful for compensating for jitter that often results from the camera module 180 being held by hand.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Figure 3:
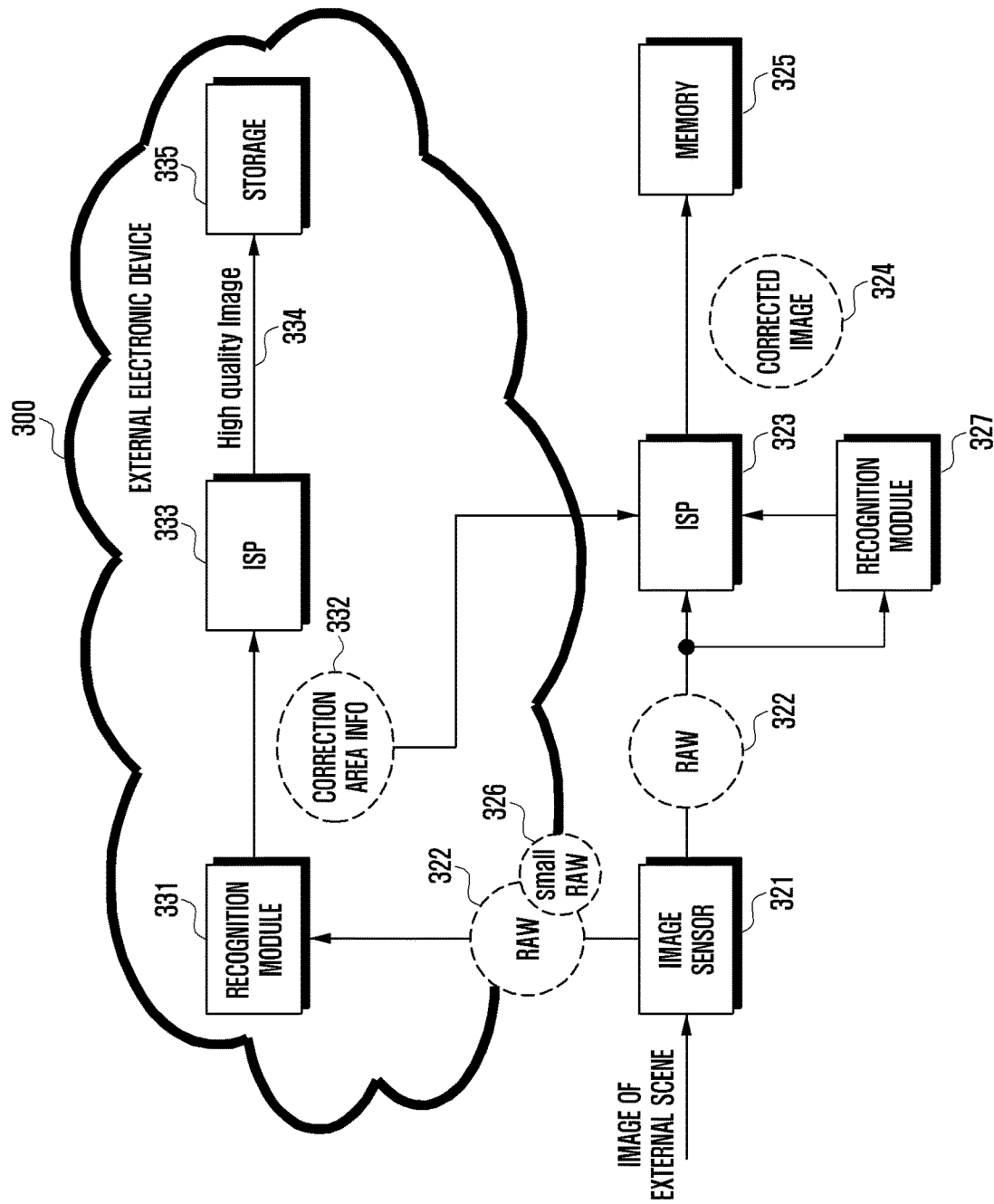
FIG. 3 is a conceptual diagram illustrating operations of an electronic device and an external electronic device according to various embodiments.

FIG. 3 is a conceptual diagram illustrating operations of an electronic device 101 and an external electronic device 300 according to various embodiments.

In various embodiments of the present disclosure, the electronic device 101 may include an image sensor 321, an ISP 323, a memory 325, and a recognition module 327.

In various embodiments, the image sensor 321 may receive an image of an external scene. The image sensor 321 may provide a raw image 322 to the ISP 323, and in some embodiments, the recognition module 327. The image sensor 321 also provides a raw image 322 to the external electronic device 300. According to certain embodiments, due to bandwidth considerations, the image sensor 321 may generate a small raw image 326 to provide to the external electronic device 300.

The external electronic device 300 may include a recognition module 331, an ISP 333, and a storage 335. The recognition module 331 may be a logical module and may be implemented as a processor of the external electronic device 300. Also, the ISP 333 may be implemented as a processor of the external electronic device 300. For example, the processor of the external electronic device 300 may perform both recognition and image processing. Although not shown, the electronic device 101 may include a communication module (e.g., the communication module 190 of FIG. 1) capable of transmitting and receiving data to and from the external electronic device 300.

Also, the external electronic device 300 may include a communication module capable of transmitting and receiving data to and from the electronic device 101. According to a certain embodiment, the electronic device 101 may also include a recognition module 327. The recognition module 327 equipped in the electronic device 101 may be configured to perform the same function as at least some of functions of the recognition module 331 of the external electronic device 300. For example, the recognition module 327 may be hardware configured to recognize a face in an image and may be used for the purpose of recognizing a face more simply and quickly than the external electronic device 300 (e.g., a server).

In various embodiments, the image sensor 321 (e.g., the image sensor 230 of FIG. 2) may acquire an image for an external scene and generate a corresponding raw image 322. The raw image 322 may be generated in various formats such as a Bayer format, a format processed by a color filter array (CFA) pattern, a format of a layer structure created by sensing all three colors in one pixel, or a format created by acquiring different parallax values in one pixel. The image sensor 321 may deliver the raw image 322 to the ISP 323 (e.g., the ISP 260 of FIG. 2) and/or the recognition module 327.

In various embodiments, the image sensor 321 may generate a small raw image 326 by reducing the volume, or bit size, of the raw image 322. For example, the image sensor 321 may generate the small raw image 326 from the raw image 322 by using various down-scale or down-sampling techniques. For example, by performing at least one of adjusting the resolution of the raw image 322, selecting at least some of a plurality of frequency bands, such as the lower frequency bands, or selecting at least one of a plurality of bit plane levels, the image sensor 321 may generate the small raw image 326 having a size smaller than a data size of the raw image 322. For example, by extracting a low frequency band from the raw image 322, the image sensor 321 may generate the small raw image 326. For example, by selecting only some of a plurality of bit plane levels of the raw image 322, the image sensor 321 may generate the small raw image 326.

The image sensor 321 may transmit the small raw image 326 to the external electronic device 300 through the communication module, saving bandwidth. The small raw image 326 may be an image including at least part of information of the raw image 322 and being smaller in volume than the raw image 322. In case of transmitting the small raw image 326, instead of the raw image 322, to the external electronic device 300, it is possible to provide an image to the external electronic device 300 faster through transmission of smaller volume. In another embodiment, a processor (e.g., the processor 120) of the electronic device 101, instead of the image sensor 321, may generate the small raw image 326 and transmit the generated small raw image 326 to the external electronic device 300 through the communication module.

In various embodiments, the image sensor 321 may transmit the raw image 322 in a compressed state to the ISP 323, the external electronic device 300, and/or the recognition module 327. The image sensor 321 may compress the raw image 322 for partial processing and may store the compressed raw image 322 in an internal memory thereof.

In various embodiments, the recognition module 331 of the external electronic device 300 may acquire the small raw image 326 through the communication module and may perform segmentation for dividing the small raw image 326 into at least one image segment. The recognition module 331 is capable of identifying objects in the image and segmenting the image as a result of the object identification. For example, the recognition module 331 may perform segmentation processing on the small raw image 326 and, based on a segmentation processing result, may identify at least one image segment from the small raw image 326. The recognition module 331 may recognize at least one image segment by applying an object recognition algorithm or a texture recognition algorithm to the image segment. The recognition module 331 may recognize at least one image segment by using various recognition algorithms or using a recognition algorithm acquired through machine learning or deep learning.

For example, the recognition module 331 of the external electronic device 300 may acquire information associated with an image segment, such as information indicating that the pixel coordinate values (100, 101), (100, 102), (102, 102) and (102, 103) correspond to person's teeth. Such pixel coordinate values may correspond to pixel coordinate values of the raw image 322. In addition, the recognition module 331 may acquire classification information such as, for example, information indicating that the small raw image 326 belongs to a category of "a person located on the street".

The recognition module 331 may acquire the classification information by using the recognition result or using a color distribution in the small raw image 326 without a recognition process. The recognition module 331 may generate correction area information 332 that includes at least one of the acquired information associated with at least one image segment or the acquired classification information. Also, the recognition module 331 may transmit the correction area information 332 to the electronic device 101. Then the ISP 323 of the electronic device 101 may correct the raw image 322 by using the correction area information 332, and thus a corrected image 324 may be generated. The corrected image 324 may have, for example, a YUV format. Also, the corrected image 324 may be stored in the memory 325. Also, the corrected image 324 may be compressed, for example, in accordance with the JPEG method, and the compressed image may be stored in the memory 325. According to a certain embodiment, the correction area information 322 may be generated by the recognition module 327 of the electronic device 101 and then delivered to the ISP 323.

In various embodiments, the raw image 322 provided from the image sensor 321 may be transmitted to the external electronic device 300 separately from the small raw image 326. Using the raw image 322, the external electronic device 300 may generate other correction area information. That is, using the raw image 322 having a size greater than the small raw image 326, the external electronic device 300 (e.g., the ISP 333 thereof) may generate correction area information different from the correction area information in case of using the small raw image 326. This may be referred to as extended correction area information. Since the raw image 322 may contain much more information than the small raw image 326, the external electronic device 300 may generate more detailed correction area information. In various embodiments, the external electronic device 300 (e.g., the ISP 333 thereof) may generate the extended correction area information directly from the raw image 322. Also, using the correction area information previously generated from the small raw image 326 and also using the raw image 322, the external electronic device 300 (e.g., the ISP 333 thereof) may generate the extended correction area information.

In various embodiments, since the raw image 322 is greater in volume than the small raw image 326, the small raw image 326 may be first transmitted to the external electronic device 300 and then the raw image 322 may be transmitted to the external electronic device 300. For example, the raw image 322 may be transmitted to the external electronic device 300 while the ISP 323 performs the correction on the raw image 322. The raw image 322 may be uploaded to the external electronic device 300 in a state of being generated by the image sensor 321 or may be uploaded as a preprocessed image in which lens distortion compensation or noise removal has been performed. Such preprocessing may be performed in the external electronic device 300. The external electronic device 300 may perform demosaic processing (a digital image process used to reconstruct a full color image from the incomplete color samples output from an image sensor overlaid with a color filter array (CFA). It is also known as CFA interpolation or color reconstruction), image format modification, or preprocessing to increase an object recognition rate. The ISP 333 of the external electronic device 300 may correct the received raw image 322 by using the previously generated correction area information 332 or using the extended correction area information. The raw image 322 may have a higher resolution than that of the small raw image 326, so that the ISP 333 of the external electronic device 300 may acquire more detailed extended correction area information from a high quality image. The ISP 333 may generate the extended correction area information by using both the previously generated correction area information and the raw image 322. The ISP 333 may acquire a high quality image 334 by correcting the raw image 322 through the extended correction area information. The high quality image 334 may be stored in the storage 335 of the external electronic device 300 and downloaded to the electronic device 101.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to various embodiments, the electronic device is not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, or hardware programmed with software, and may interchangeably be used with other terms, for example, "logic", "logic block", "part", "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 4:
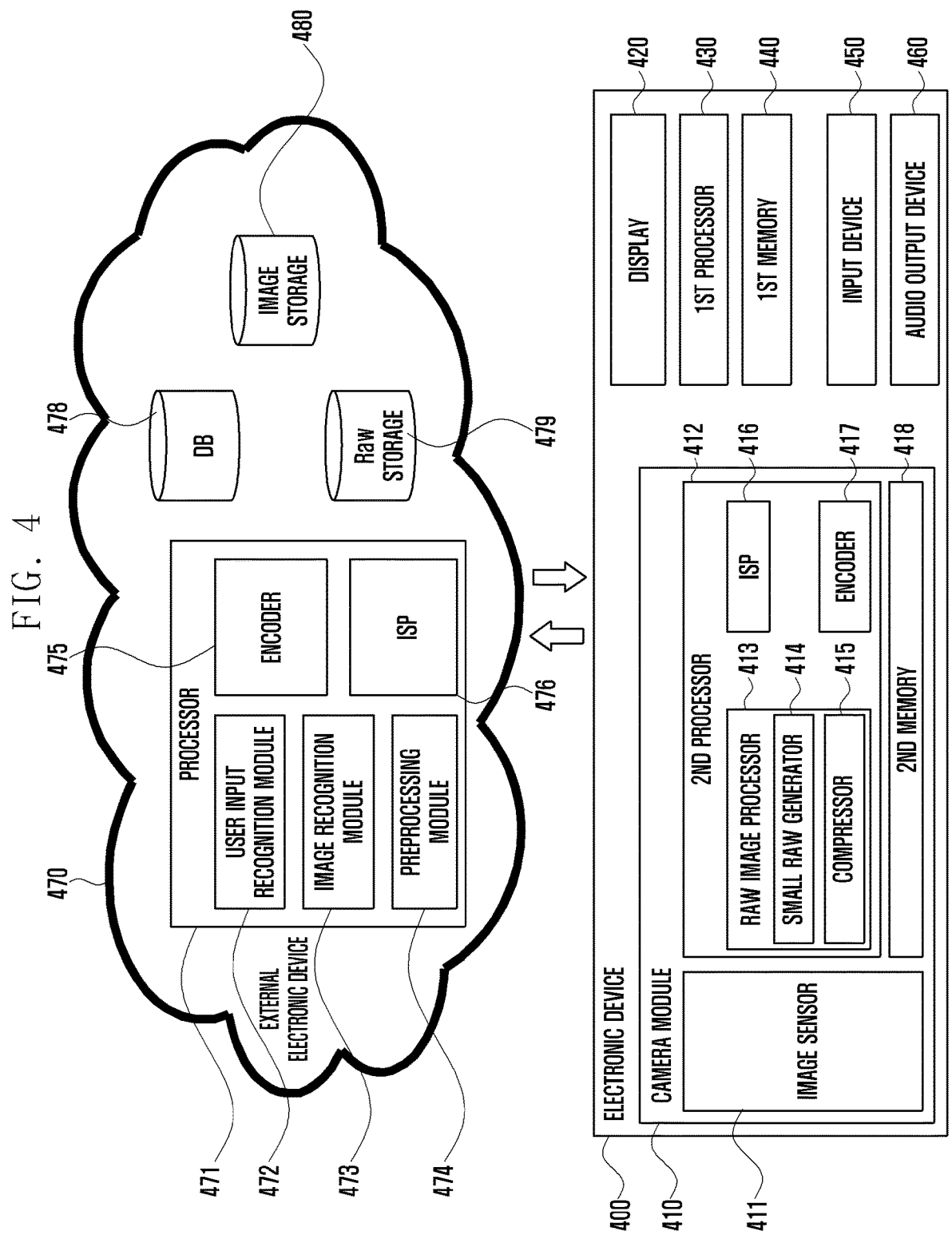
FIG. 4 is a block diagram illustrating an electronic device and an external electronic device according to various embodiments.

FIG. 4 is a block diagram illustrating an electronic device and an external electronic device according to various embodiments.

The electronic device 400 includes an image sensor 411 that takes a photograph of a scene, thereby resulting in an image. The second processor 412 includes a raw image processor for generating a version of the raw image with reduced bandwidth, either a compressed raw image or a small raw image. In some embodiments, the small raw image is transmitted to the external electronic device 470. External electronic device 470 includes an image recognition module that identifies objects in the image and determines a reliability measure for each of the identified objects. The user input recognition module 472, prompts the user to input the objects that are seen in the image. The image recognition module 473 locates each of the objects that are input by the user. The objects that are among both groups have reliability measured increased.

The electronic device 400 (e.g., the electronic device 101) according to various embodiments may include a camera module 410, a display 420, a first processor 430, a first memory 440, an audio device 450, and an audio output device 460. The camera module 410 according to various embodiments may include an image sensor 411, a second processor 412, and a second memory 418. The second processor 412 according to various embodiments may include a raw image processing module 413, an ISP 416, and an encoder 417. At least some of operations performed by the second processor 412 may be performed by the first processor 430. The raw image processing module 413, the ISP 416, and the encoder 417 may be logical modules, and thus operations thereof may be performed by the second processor 412 (e.g., the processor 120). In another embodiment, at least one of the raw image processing module 413, the ISP 416, and the encoder 417 may be implemented as hardware within the second processor 412.

Although not shown, the electronic device 400 may include a communication module (e.g., the communication module 190 of FIG. 1) for data communication with an external electronic device 470. Also, the external electronic device 470 may include a communication module for data communication with the electronic device 400.

In various embodiments, the image sensor 411 (e.g., the image sensor 230 of FIG. 2 or the image sensor 321 of FIG. 3) may acquire various raw images of things for photography. The image sensor 411 may acquire various types of raw images depending on a color filter array (CFA) pattern. The image sensor 411 may acquire a raw image of a dual pixel (DP) structure (or 2PD) including different parallax values (or a phase difference) in one pixel. The image sensor 411 may include a plurality of image sensors having the same or different characteristics (e.g., a dual sensor such as RGB & RGB, RGB & Mono or Wide & Tele, or an array sensor having two or more sensors attached). Using these image sensors, it is possible to acquire one or more raw images with respect to one scene. The acquired raw image may be stored in the second memory 418 (e.g., DRAM) as it is or after additional processing.

The raw image acquired according to various embodiments may be formed in various formats (e.g., Bayer format). The raw image may be represented by one color of red (R), green (G) and blue (B) per pixel and in a bit-depth from 8 to 16 bits. A variety of CFA patterns may be applied to the raw image. The raw image may have a layer structure including information of a plurality of colors (e.g., two or more colors of R, G and B) for one pixel. Depending on various configurations of the image sensor, the raw image may include parallax (phase difference) information as well as color information. Information related to image shooting (e.g., time, location, illumination, etc.) may be generated as metadata and stored in association with the raw image. For example, the second processor 412 may acquire metadata for the raw image through the image sensor 411. The metadata acquirable through the image sensor 411 may include a focal length, an auto focus area, an orientation in case of shooting, a color space, an exposure time, and the like. In addition, the metadata may include location information on image shooting, etc., which can be obtained through another sensor (e.g., a GPS sensor) different from the image sensor.

In various embodiments, the raw image processing module 413 may perform various types of processing on the raw image acquired from the image sensor 411. For example, the raw image processing module 413 may perform lens distortion compensation or noise removal on the raw image.

The raw image processing module 413 according to various embodiments may include a small raw image generation module 414 and a compression module 415. The small raw image generation module 414 may generate the small raw image from the raw image by using various down-scale techniques (e.g., operations of reducing a size or lowering a resolution) or down-sampling techniques (e.g., operations of taking only one or some of samples). The compression module 415 may compress the raw image or the small raw image by using various compression algorithms, and may store the compressed raw image or the compressed small raw image in the second memory 418. The small raw image may be temporarily or non-temporarily stored in the second memory 418. A communication module (not shown, e.g., the communication module 190) of the electronic device 400 may transmit the small raw image stored in the second memory 418 to the external electronic device 470.

In various embodiments, the ISP 416 (e.g., the ISP 260 of FIG. 2 or the ISP 423 of FIG. 3) may perform image processing on the raw image stored in the second memory 418. For example, using recipe information (e.g., image segment, layer, vector, scene category, etc.) acquired from the external electronic device 470 via the communication module, the ISP 416 may perform various kinds of processing (e.g., correction) on the raw image. According to one embodiment, the ISP 416 may transmit the raw image or the small raw image to the external electronic device 470 through the communication module.

External electronic device 470 includes an image recognition module 473 that identifies objects in the image and determines a reliability measure for each of the identified objects. The user input recognition module 472, prompts the user to input the objects that are seen in the image. The image recognition module 473 locates each of the objects that are input by the user. The objects that are among both groups have reliability measured increased.

The external electronic device 470 provides type of objects and locations that are identified with high reliability. Then the ISP 416 may receive the type of objects and locations from the external electronic device 470 through the communication module and process the raw image. The ISP 416 may compress the processed raw image in the form of JPEG for example, and store the compressed raw image in the first memory 440.

In various embodiments, the encoder 417 may encode the raw image processed by the ISP 416 to generate an image file (e.g., JPEG MPEG 360-degree panorama, etc.), and may store the generated image file in the first memory 440.

In various embodiments, the first processor 430 (e.g., the processor 120 of FIG. 1) may be electrically connected to the camera module 410, the display 420, the first memory 440, the input device 450, the audio output device 460, and the communication module (not shown), control at least one of them, and perform various data processing and operations.

According to various embodiments, the first processor 430 may transmit an image (e.g., corresponding to an image being displayed through the display 420) stored in the electronic device 400 to the external electronic device 470 through the communication module such that the external electronic device 470 recognizes an object (e.g., person, sky, balloon, grass) in the image. For example, the first processor 430, or the second processor 412 under the control of the first processor 430, may acquire the raw image, the small raw image, the compressed raw image, or the compressed small raw image from the second memory 418 and transmit the acquired image to the external electronic device 470 through the communication module. In another example, the first processor 430 may acquire an image file, corresponding to the image being displayed via the display 420, from the first memory 440 and transmit the image file to the external electronic device 470.

According to various embodiments, the first processor 430 may transmit a user input, acquired in the electronic device 400, to the external electronic device 470 through the communication module such that the external electronic device 470 recognizes a word corresponding to the object from the user input. In various embodiments, the user input may be acquired while the image corresponding to the image transmitted to the external electronic device 470 is being displayed. For example, the user input may be a user's utterance (e.g., "Make the sea color much bluer.") acquired through the microphone while a certain photo is being provided through the display 420. In various embodiments, the first processor 430 may perform preprocessing (e.g., noise removal or suppression, conversion to text, automatic gain control (AGC), adaptive echo canceller, etc.) on the user's utterance in order to increase a voice recognition rate in the external electronic device 470 or reduce the size of data to be transmitted to the external electronic device 470. Then the preprocessed utterance may be transmitted from the electronic device 400 to the external electronic device 470. In various embodiments, the user input may be text obtained from the keyboard of the electronic device 400 or from the touch-sensitive display 420, and may be transmitted to the external electronic device 470 via the communication module.

The first processor 430 according to various embodiments may receive object matching information from the external electronic device 470 in response to the transmission of the user input and the image (or image file). In various embodiments, the object matching information may be information associated with a specific object matched with a specific word (e.g., "sea" as a grammatical object corresponding to an object in the user utterance, "Make the sea color much bluer.") recognized from the user input among objects in the image. That is, the object matching information may be information for identifying an object, which is indicated as an editing target by the user, selected from among objects in the displayed image. For example, the object matching information may include pixel coordinate values indicating the location of the selected object in the image. Additionally, the first processor 430 may receive information about an operation (e.g., an editing method) corresponding to a user's intent (e.g., command) from the external electronic device 470 in response to the transmission of the user input and the image (or image file) according to various embodiments.

The first processor 430 or the second processor 412 (e.g., the ISP 416) according to various embodiments may edit an image, based on information received from the external electronic device 470 in response to the transmission of the user input and the image (or image file). For example, the first processor 430 or the second processor 412 may acquire an image (e.g., corresponding to an image being displayed through the display 420) stored in the electronic device 400 through the memory (e.g., the first memory 440 or the second memory 418), and may identify a specific segment in the acquired image, based on the object matching information received from the external electronic device 470. Also, the first processor 430 may identify a processing method for the specific segment, based on operation information received from the external electronic device 470. Then, the first processor 430 may edit the image by processing the specific segment, based on the identified processing method. The first processor 430 may display the edited image via the display 420 and store the edited image in the memory (e.g., the first memory 440 or the second memory 418).

According to various embodiments, such image editing may be performed by an external electronic device in response to the reception of the user input and the image (or image file) from the electronic device 400. For example, the external electronic device 470 (e.g., the ISP 476), or another external electronic device (not shown, e.g., an image editing server) functionally connected thereto, may perform the image editing and transmit an edited result to the electronic device 400 directly or via the external electronic device 470.

The first processor 430 according to various embodiments may request a user feedback for the image editing. For example, the first processor 430 may output a pop-up message having content of inquiring about the accuracy of editing (e.g., "Did the sea color become much bluer?") through the display 420, or may output a corresponding voice through the audio output device 460 (e.g., the speaker). In addition, the first processor 430 may display the edited image segment to be distinguished from the other image segments. For example, various techniques of visually distinguishing the image segments from each other, such as emphasizing the outline of the edited image segment, may be applied to various embodiments. Such visual distinction may allow the user to identify the edited image segment and judge whether the image editing has been done in accordance with his or her intention. The first processor 430 may obtain a user feedback on the inquiry through the display 420 or the input device 450 (e.g., the microphone), and may transmit the user feedback to the external electronic device 470 to use it in improving the performance of image recognition. According to various embodiments, the external electronic device 470 may adjust the recognition reliability by using the user feedback received from the electronic device 400.

If any object other than the objected intended by the user has been edited as a result of checking the user feedback, the first processor 430 according to various embodiments may request the user to directly designate an editing target. For example, the first processor 430 may output a pop-up message (e.g., "Touch the sea.") requesting the user to designate an editing target through the display 420 or may output a corresponding voice through the audio output device 460 (e.g., the speaker). The first processor 430 may obtain a user feedback on the direct designation request through the display 420 or the input device (e.g., the microphone), and may transmit the user feedback to the external electronic device 470.

The first processor 430 according to various embodiments may receive, from the external electronic device 470, a message of failing to find the editing target in response to the transmission of the user input and the image (or image file). Then, the first processor 430 may request the user to directly designate the editing target. For example, the first processor 430 may output a pop-up message (e.g., "Touch the sea.") requesting the user to designate an editing target through the display 420 or may output a corresponding voice through the audio output device 460 (e.g., the speaker). The first processor 430 may obtain a user feedback on the direct designation request through the display 420 or the input device 450 (e.g., the microphone), and may transmit the user feedback to the external electronic device 470.

The external electronic device 470 according to various embodiments may be implemented as a cloud server. The external electronic device 470 may perform functions of a network management for servers constituting a cloud system and for electronic devices (e.g., the electronic device 400) connectable to the cloud system, a cloud service management associated with providable services and rights, and a storage management. The external electronic device 470 may include a processor 471, a database 478, a raw image storage 479, and a learning image storage 480. The processor 471 according to various embodiments may include a preprocessing module 474, a user input recognition module 472, an image recognition module 473, an encoder 475, and an ISP 476. At least some of operations performed by the first processor 430 or the second processor 412 of the electronic device 400 may be performed by the processor 471 of the external electronic device 470. The preprocessing module 474, the user input recognition module 472, the image recognition module 473, the encoder 475, and the ISP 476 may be logical modules, and thus the operations thereof may be performed by the processor 471 or the first or second processor 430 or 412 of the electronic device 400. In another embodiment, at least one of the preprocessing module 474, the user input recognition module 472, the image recognition module 473, the encoder 475, and the ISP 476 may be implemented as hardware within the processor 471 of the external electronic device 470 or as hardware within the first or second processor 430 or 412 of the electronic device 400.

The user input recognition module 472 according to various embodiments may receive a user input (e.g., utterance or text) from the electronic device 400 via a communication module (not shown) of the external electronic device 470. The user input recognition module 472 may acquire various kinds of meaningful information (e.g., a grammatical subject, a grammatical object, a command, etc.) from the user input. According to one embodiment, the user input recognition module 472 may convert utterance to text. For example, the user input recognition module 472 may include an acoustic model and a language model. For example, the acoustic model may include information related to speech, and the language model may include information about phoneme units and a combination thereof. The user input recognition module 472 may convert a user's utterance into text by using the utterance-related information and the phonemic-related information. Information about the acoustic model and the language model may be stored, for example, in the database. According to one embodiment, the user input recognition module 472 may acquire meaningful information from text (e.g., the user input converted from utterance to text by the electronic device 400 or the user input recognition module 472) by performing natural language understanding (NLU). For example, the user input recognition module 472 may obtain a grammatical object by dividing text into sentence components through a syntactic analysis. Also, the user input recognition module 472 may understand a user's intention (e.g., command) by performing a grammatical analysis or a semantic analysis.

The user input recognition module 472 according to various embodiments may generate an object list from information acquired as a result of recognizing the user input (e.g., a grammatical object "sea" from the user utterance, "Make the sea color much bluer."). In various embodiments, objects contained in the object list may be editing targets.

The user input recognition module 472 according to various embodiments may generate operation information from information acquired as a result of user input recognition. For example, from the user utterance, "Make the sea color much bluer.", the operation information may include "make . . . bluer" corresponding to a user intention (command) and also include "sea" and "much" as parameters necessary for expressing the user intention. In various embodiments, using the operation information, the electronic device (e.g., the electronic device 400 or the external electronic device 470) may perform image processing on an object designated as the editing target.

The preprocessing module 474 according to various embodiments may preprocess an image (e.g., a raw image, a small raw image) or an image file received from the electronic device 400 and then sends it to the image recognition module 473 or the ISP 476. For example, preprocessing may include an operation of acquiring the raw image by decompressing the image file, an operating of performing demosaic processing, an operation of transforming an image format into YUV, or the like.

The image recognition module 473 according to various embodiments may receive the image (e.g., the raw image, the small raw image) from the electronic device 400 through the communication module of the external electronic device 470 or further through the preprocessing module 474.

The image recognition module 473 according to various embodiments may perform an operation of analyzing various kinds of meaningful information (e.g., object recognition, velocity vector representing the velocity of a specific object in an image, face recognition, segmentation, scene parsing, etc.) from the received image. The image recognition module 473 may perform an operation of generating, storing, or transmitting the analysis result in association with the image. The analysis result may include recipe information such as image segment, layer, vector, or scene category, and may be utilized in image processing by the ISP 476.

The image recognition module 473 according to various embodiments may acquire various kinds of meaningful information (e.g., location information such as pixel coordinate values about each image segment, identification information of an object associated with each image segment, reliability associated with object recognition, etc.) from the received image by using a recognition algorithm obtained by applying machine learning or deep learning to the learning image storage 480. According to a certain embodiment, the image recognition module 473 may perform object recognition in an image, based on user information. For example, the user information may be acquired from images (e.g., photos of family and relatives, photos of residence, etc.) registered in the database 478.

The image recognition module 473 according to various embodiments may identify a specific object designated as an editing target by the user, by comparing information acquired as the image recognition result with information acquired as the speech recognition result. For example, the image recognition module 473 may receive information about an object (a grammatical object) from the user input recognition module 472, and may identify, as an editing target, a specific object matched with the grammatical object among objects identified through image recognition. The image recognition module 473 may transmit object matching information about the identified object to the electronic device 400 or the ISP 476. Additionally, the image recognition module 473 may identify the object, based on the reliability associated with the recognition of the object acquired as a result of image recognition. For example, an image is divided into one or more image segments, each of which may be recognized as one or more objects. Also, the object may have reliability assigned thereto in connection with recognition. For example, a first image segment may be recognized with a probability (i.e., reliability) of 'sea' being 80% (first priority) and a probability of 'sky' being 20% (second priority). A second image segment may be recognized with a probability of 'sky' being 80% (first priority) and a probability of 'sea' being 20% (second priority). In this situation, when the editing target recognized from the user input is 'sea', the first image segment may be determined as the editing target because the editing target is closer to the first image segment in terms of reliability (probabilistically) than to the second image segment.

The image recognition module 473 according to various embodiments may manage objects having similar meanings (e.g., a bookstore, a bookshop, and a book stall) as one set of synonyms. Based on such sets of synonyms, the image recognition module 473 may identify a specific object designated as the editing target by the user among objects recognized from the image. For example, if there is 'a bookstore' among objects recognized from the image, but if the user input has no 'bookstore' and has only synonym 'bookshop' or 'book stall', the 'bookstore' may be identified as a target designated by the user.

The image recognition module 473 according to various embodiments may adjust the reliability associated with the recognition of an object acquired as a result of image recognition, based on a reliability-based matching result. For example, one image segment may be recognized as a plurality of objects, and priorities may be assigned to respective objects according to reliability in an object list corresponding to one image segment. In one embodiment, the reliability adjustment may be performed according to the ranking assigned to "an object matched with the editing target recognized through user input recognition" among objects. For example, when the top-rank object is matched with the editing target, the image recognition module 473 may increase (i.e., upwardly adjust) the reliability of the object. If the next-rank (e.g., second priority) object is matched with the editing target, the image recognition module 473 may decrease (i.e., downwardly adjust) the reliability of an object having higher rank (e.g., the first priority object) and increase the reliability of the corresponding object. For example, a certain image segment may be recognized as a 'sun' or a 'torch', and the probability of being 'sun' may be higher. In this situation, if the user input has a 'sun', the reliability of the object 'sun' having the first priority may be increased. If the user input has a 'torch', the reliability of the object 'sun' having the first priority may be decreased and the reliability of the object 'torch' having the second priority may be increased. If an object with lower rank is matched with the editing target, the image recognition module 473 may perform an operation of changing the ranking. For example, in case of the second priority matching, it is possible to change the first and second priorities of objects to each other.

The image recognition module 473 according to various embodiments may adjust the reliability associated with the recognition of an object acquired as a result of image recognition, based on a user feedback for a matching result. For example, if the user feedback for the first priority matching indicates a correct answer, the image recognition module 473 may increase the reliability of the first priority object. If the feedback for the second priority matching indicates a correct answer, the image recognition module 473 may decrease the reliability of the first priority object and increase the reliability of the second priority object. If the feedback for the second priority matching indicates a correct answer, the image recognition module 473 may change the ranking. If the feedback for matching indicates an incorrect answer, the image recognition module 473 may decrease the reliability or ranking of the object.

According to various embodiments, if the user feedback for the matching result indicates an incorrect answer or is not matched up to a predetermined rank (e.g., second priority), the image recognition module 473 may transmit, to the electronic device 400 through the communication module of the external electronic device 470, a message of requesting the user to directly designate the editing target. Based on a feedback of this request, the image recognition module 473 may adjust the reliability.

As an example, if there is an object designated by the user in the object list, the reliability of the object may be increased (e.g., adjusted upward to exceed the first priority object, thus priorities being changed).

As another example, a certain image region may be recognized as a 'sun', 'torch', or 'streetlight', in which 'sun' has the highest priority and 'streetlight' has the lowest priority. In this situation, if the user input has a 'street light (third priority)' other than a 'sun (first priority)' or 'torch (second priority)', the reliability may be adjusted upward (e.g., 100%) for the object 'streetlight' as the object closest to the image segment.

As still another example, if there is no object designated by the user in the object list (e.g., if the user input has neither sun, nor torch, nor streetlight, and has a word which does not exist in the object list), the word designated by the user may be added as an object recognizable in connection with the image segment, and the reliability thereof may be set to a predetermined value or less (e.g., 50% or less).

As yet another example, the absence of an object designated by the user in the object list may mean a recognition error of user input. For example, when the user pronounces 'sea', a similar pronunciation other than 'sea' may be recognized due to an error of speech recognition. This may result in the absence of an object designated by the user in the object list. In this case, the image recognition module 473 may transmit a re-request of the user input to the electronic device 400 through the communication module of the external electronic device 470. Then, the image recognition module 473 may adjust reliability, based on a user reaction to the re-request.

As further another example, a certain image segment in the image may not be recognized as an object. In this situation, when the user selects such an 'unidentified image segment', an object designated by the user may be determined as an object of the image segment, and the reliability thereof may be set as a predetermined value.

When the user feedback for a matching result indicates an incorrect answer, the image recognition module 473 according to various embodiments may determine whether the incorrect answer is intentional. If so, the image recognition module 473 may transmit a warning message to the electronic device 400 via the communication module of the external electronic device 470. For example, when an incorrect answer repeatedly happens more than a predetermined number of times, a warning message that indicates a possibility of decreased recognition rate may be sent to the user. According to various embodiments, operations for image recognition (i.e., an image recognition model) in the image recognition module 473 may be personalized to be adapted to the user. Thus, if the feedback is intentionally incorrect, the image recognition rate for the user may be continuously reduced. If the recognition rate of some objects is lower than the recognition rate of a common recognition engine, a user's personalized recognition engine may be replaced with the common recognition engine of the initialization value.

The image recognition module 473 according to various embodiments may store the adjusted reliability in the learning image storage 480 so that image recognition is performed using the adjusted reliability.

The ISP 476 according to various embodiments may perform image processing based on recipe information acquired through image recognition. The ISP 476 may receive additional information (e.g., a feature vector representing the feature of an object or a part thereof (e.g., hair)) corresponding to the recipe information from the database 478 and use the received additional information in image processing. The processed image may be transmitted to the electronic device 400 or the encoder 475 or may be stored in the raw image storage 479. The image processing may include functions such as a white balance, a color adjustment, a noise reduction, a sharpening, and a detail enhancement. These functions may be performed for each image segment, based on the recipe information.

The encoder 475 according to various embodiments may generate an image file (e.g., JPEG MPEG 360-degree panorama, etc.) by encoding the raw image processed by the ISP 476. The image file generated by the encoder 475 may be transmitted to the electronic device 400 via the communication module of the external electronic device 470 or may be stored in the raw image storage 479.

Figure 5:
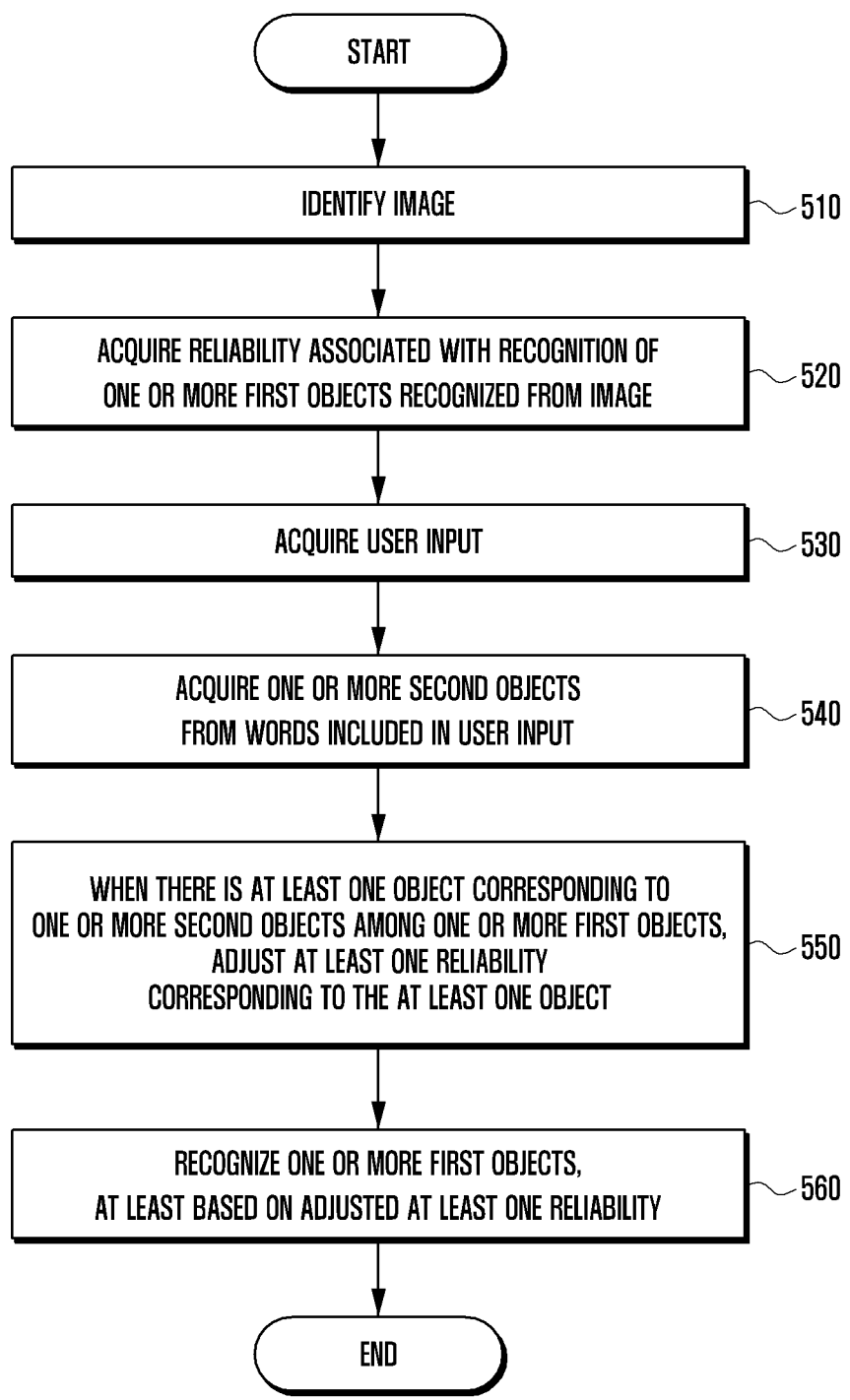
FIG. 5 is a flow diagram illustrating operations of a processor according to various embodiments.

FIG. 5 is a flow diagram illustrating operations of a processor according to various embodiments.

The operations shown in FIG. 5 may be executed by the processor 120 of FIG. 1. In addition, such operations may be executed through at least one of the processors 471, 412, and 430 of FIG. 4.

According to various embodiments, at operation 510, the processor may receive an image. For example, this image identified by the processor may be a raw image acquired through the image sensor (e.g., 411 in FIG. 4) or a small raw image acquired through the raw image processing module (e.g., 413 in FIG. 4). In addition, the image may be a decompressed version of an image file acquired through the second memory 418 or the first memory 430. In various embodiments, objects in the image may be recognized using various image recognition schemes (e.g., the image recognition module 473). For example, the image may be divided into a plurality of image segments, and each image segment may be recognized as one or more objects by various image recognition schemes.

According to various embodiments, at operation 520, the processor may acquire one or more reliabilities associated with the recognition of one or more first objects recognized from the image. For example, the one or more first objects may be recognized as objects corresponding to one of the image segments, and the one or more reliabilities associated with the recognition of each of the one or more first objects may be acquired using various image recognition schemes (e.g., image recognition module 473).

According to various embodiments, at operation 530, the processor may acquire a user input from at least one of, for example, the microphone, the keyboard, or the touch-sensitive display. Words in the user input may be recognized through various character recognition schemes (e.g., the user input recognition module 472). In certain embodiments, the user may be prompted to input which objects appear in the image.

According to various embodiments, at operation 540, the processor may acquire one or more second objects (e.g., a word corresponding to a grammatical object among sentence components) from words included in the user input.

According to various embodiments, at operation 550, when there is at least one object corresponding to the one or more second objects among the one or more first objects, the processor may adjust at least one reliability corresponding to the at least one object. For example, suppose that the one or more first objects include a first priority object and a second priority object the priorities of which are determined in order of reliability. When the first priority object corresponds to the second object, the reliability of the first priority object may be increased (i.e., adjusted upward). When the second priority object corresponds to the second object, the reliability of the first priority object may be decreased (i.e., adjusted downward) and the reliability of the second object may be increased (i.e., adjusted upward).

According to various embodiments, at operation 560, the processor may recognize the one or more first objects by using the image recognition, at least based on the adjusted at least one reliability. For example, the second priority object before the reliability adjustment may be recognized as the first priority object after the reliability adjustment.

Figure 6:
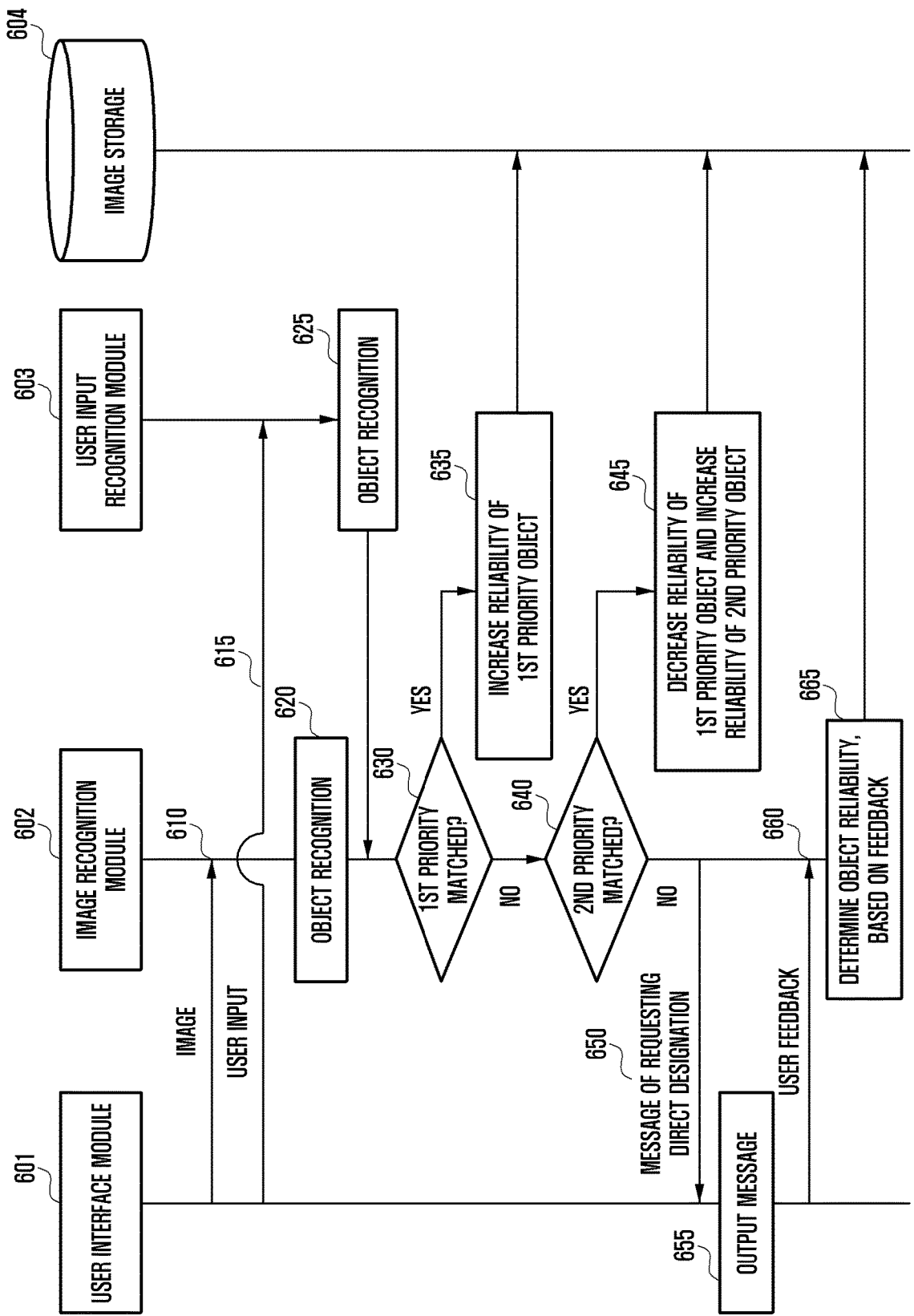
FIG. 6 is a flow diagram illustrating operations of a processor for improving an image recognition rate according to various embodiments.

FIG. 6 is a signal flow diagram illustrating operations of a processor for improving an image recognition rate according to various embodiments.

The operations shown in FIG. 6 may be executed through a user interface module 601, an image recognition module 602, and a user input recognition module 603. At least some of the operations performed by the user interface module 601, the image recognition module 602, and the user input recognition module 602 may be executed by the processor 120 of FIG. 1. In addition, at least some of the operations performed by the user interface module 601, the image recognition module 602, and the user input recognition module 603 may be executed through at least one of the processors 412, 430, 471 of FIG. 4.

According to various embodiments, at operation 610, the user interface module 601 may acquire an image and transmit it to the image recognition module 602. For example, this image may be a raw image acquired through the image sensor (e.g., 411 in FIG. 4) or a small raw image acquired through the raw image processing module (e.g., 413 in FIG. 4). In addition, the image may be a decompressed version of an image file acquired through the memory (e.g., 418 or 430 in FIG. 4).

According to various embodiments, at operation 615, the user interface module 601 may acquire a user input and transmit it to the user input recognition module 603. This user input may be acquired from at least one of, for example, the microphone, the keyboard, or the touch-sensitive display. If the user input is an utterance acquired from the microcomputer, the acquired utterance may be converted into text and then transmitted to the user input recognition module 603. Alternatively, the user input recognition module 603 may convert the utterance into text.

According to various embodiments, at operation 620, the image recognition module 602 (e.g., 473 of FIG. 4) may recognize one or more objects from the received image by using an algorithm obtained by applying various learning engines (e.g., machine learning, deep learning) to an image storage 604. According to one embodiment, the image recognition module 602 may identify one or more image segments from the received image and recognize the identified image segment as at least one object. In addition, the image recognition module 602 may acquire reliability associated with object recognition by using the obtained algorithm.

According to various embodiments, at operation 625, the user input recognition module 603 (e.g., 472 of FIG. 4) may recognize, as an editing target, an object designated by the user from the received user input.

According to various embodiments, at operation 630, the image recognition module 602 may determine whether there is a first priority object corresponding to the object (i.e., the editing target) recognized by the user input recognition module 603 among one or more first priority objects recognized from the image.

According to various embodiments, if it is determined at operation 630 that there is an object corresponding to the editing target among one or more first priority objects, the image recognition module 602 may increase (i.e., adjust upward), at operation 635, the reliability of the first priority object corresponding to the editing target and also store a result of the reliability adjustment in the image storage 604 together with the image. For example, a first image segment may be recognized with a probability (i.e., reliability) of 'sea' being 80% (first priority) and a probability of 'sky' being 20% (second priority). Also, a second image segment may be recognized with a probability of 'sky' being 80% (first priority) and a probability of 'sea' being 20% (second priority). In this situation, when an object (i.e., a grammatical object) recognized from the user input is 'sea', a target that seems to be designated by the user may be determined as the first image segment because it is closer to the first image segment in terms of reliability (probabilistically) than to the second image segment. Therefore, the reliability of the first priority object 'sea' in the first image segment may be increased (i.e., adjusted upward). In addition, the reliability of the second priority object 'sky' in the first image segment may be decreased (i.e., adjusted downward).

According to various embodiments, if it is determined at operation 630 that there is no object corresponding to the editing target among the one or more first priority objects, the image recognition module 602 may determine at operation 640 whether there is an object corresponding to the editing target among one or more second priority objects recognized from the image.

According to various embodiments, if it is determined at operation 640 that there is an object corresponding to the editing target among one or more second priority objects, the image recognition module 602 may increase (i.e., adjust upward), at operation 645, the reliability of the second priority object corresponding to the editing target, decrease (i.e., adjust downward) the reliability of the first priority object in the corresponding image segment, and also store a result of the reliability adjustment in the image storage 604 together with the image. As in the above example, the first image segment may be recognized with a probability (i.e., reliability) of 'sea' being 80% (first priority) and a probability of 'sky' being 20% (second priority). Also, the second image segment may be recognized with a probability of 'sky' being 80% (first priority) and a probability of 'sea' being 20% (second priority). Further, a third image segment may be recognized with a probability of 'torch' being 80% (first priority) and a probability of 'sun' being 20% (second priority). In this situation, when an object (i.e., a grammatical object) recognized from the user input is 'sun', the reliability of the second priority object 'sun' in the third image segment may be increased (i.e., adjusted upward), and the reliability of the first priority object 'torch' in the third image segment may be decreased (i.e., adjusted downward) so that such priorities are reversed.

According to various embodiments, if it is determined at operation 640 that there is no object corresponding to the editing target among one or more second priority objects, the image recognition module 602 may transmit, at operation 650, a message of requesting the user to directly designate the editing target to the user interface module 601. For example, if the image is divided into the first to fourth image segments as a result of image recognition, the fourth image segment may not be identified as a corresponding object contrary to the other image segments being identified as one or more objects as described above. In this situation, if an object (a grammatical object) recognized from the user input is a 'cloud', operation 650 may be performed.

According to various embodiments, in response to the request message received from the image recognition module 602, the user interface module 601 may output a message having the content of requesting a direct designation (e.g., "Touch the cloud.") at operation 655. For example, the user interface module 601 may output a pop-up message through the display or output a voice corresponding to the content through the speaker.

According to various embodiments, at operation 660, the user interface module 601 may acquire a user feedback (e.g., information about an image segment selected by the user) through the display or the input device (e.g., the microphone), and may transmit the user feedback to the image recognition module 602.

According to various embodiments, at operation 665, the image recognition module 602 may determine the reliability of the object, based on the user feedback, and may store result information associated with the determination of reliability in the image storage together with the image. For example, if there is an object designated by the user in a list of previously recognized objects, the reliability of the object may be adjusted upward. If the object list does not have the object designated by the user, the reliability of the object may be set to a predetermined value (e.g., 50%).

Figure 7:
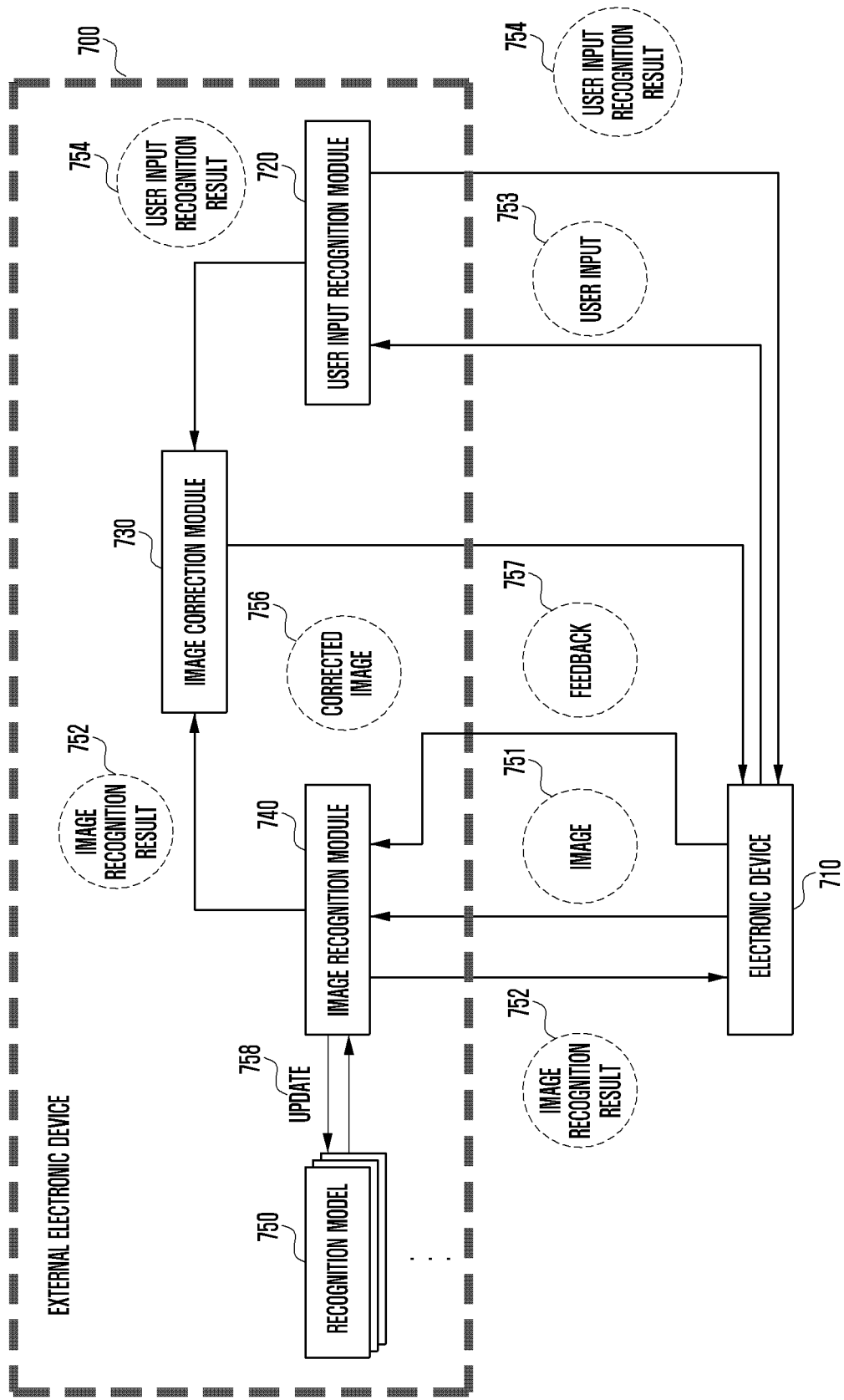
FIG. 7 is a diagram illustrating operations of an electronic device and an external electronic device according to various embodiments.

FIG. 7 is a diagram illustrating operations of an electronic device and an external electronic device according to various embodiments.

Referring to FIG. 7, an electronic device 710 may include all or a part of the electronic device 101 of FIG. 1 or of the electronic device 400 of FIG. 4. An external electronic device 700 (e.g., 470 of FIG. 4) may include an image recognition module 740, a user input recognition module 720, and an image correction module 730. The image recognition module 740, the user input recognition module 720, and the image correction module 730 are functionally connected to each other, thereby freely transferring and sharing data therebetween. According to one embodiment, the image recognition module 740, the user input recognition module 720, and the image correction module 730 may be logical modules, and thus at least one processor (e.g., 412, 430, 471 in FIG. 4) may perform their operations. According to one embodiment, at least one of the image recognition module 740, the user input recognition module 720, and the image correction module 730 may be implemented as hardware within the processor (e.g., 412, 430, or 471 in FIG. 4). According to one embodiment, the processor (e.g., 412 or 430 in FIG. 4) of the electronic device 710 may perform the same operation as that of the image correction module 730.

According to various embodiments, an image 751 acquired by the electronic device 710 may be transmitted to the image recognition module 740 of the external electronic device 700. In addition, a user input 753 (e.g., utterance or text) acquired by the electronic device 710 may be transmitted to the user input recognition module 720 of the external electronic device 710.

According to various embodiments, the user input recognition module 720 (e.g., 472 of FIG. 4) may perform object recognition from the user input and then transmit a user input recognition result 754 to the electronic device 710 or the image correction module 730.

According to various embodiments, the image correction module 730 may include various members for image correction, such as the ISP (e.g., 476 in FIG. 4), the encoder (e.g., 475 in FIG. 4), and the preprocessing module (e.g., 474 in FIG. 4). The image correction module 730 may perform image correction based on the image recognition result 752 and the user input recognition result 754. Then, the image correction module 730 may transmit a corrected image 756 to the electronic device 710.

According to various embodiments, the image recognition module 740 (e.g., 473 in FIG. 4) may perform object recognition from an image. According to one embodiment, when performing the object recognition based on a deep learning recognition model, the image recognition module 740 may use differently learned recognition models for the respective users. For example, personalized recognition models 750 in which a user's native language, user-related persons, a residential environment, etc. are considered may be stored in the database, and the image recognition module 740 may retrieve a suitable recognition model for the user of the electronic device 710 to perform the object recognition. The image recognition module 740 may transmit the image recognition result 752 to the electronic device 710 or the image correction module 730.

According to various embodiments, the image recognition module 740 may adjust the object reliability, based on a feedback 757 received from the electronic device 710 as a user's response to the corrected image 756, and may also perform an update 758 of the user's recognition model, based on result information related to the reliability adjustment. Various examples regarding the user feedback and the reliability adjustment are as previously discussed with reference to FIGS. 4 to 6.

According to various embodiments of the present disclosure, an electronic device may comprise a communication module, and a processor functionally connected to the communication module. The processor may be configured to identify an image including one or more objects, to acquire one or more first objects corresponding to at least a part of the one or more objects and recognized at least based on an image recognition scheme, and one or more reliabilities associated with recognition of the one or more first objects, to acquire an input including information having one or more words associated with the image, to acquire one or more second objects corresponding to at least a part of the one or more words and recognized at least based on a character recognition scheme, to, when there is at least one object corresponding to the one or more second objects among the one or more first objects, adjust at least one reliability corresponding to the at least one object among the one or more reliabilities, and to recognize the one or more first objects by using the image recognition scheme at least based on the one or more reliabilities including the adjusted at least one reliability.

The processor may be further configured to adjust upward at least one reliability corresponding to the at least one object among the one or more reliabilities when there is the at least one object corresponding to the one or more second objects among the one or more first objects.

The processor may be further configured to determine, among the first objects, a first object set corresponding to a first priority and a second object set corresponding to a second priority lower than the first priority, to, when an object corresponding to the one or more second objects is included in the first object set, adjust upward a reliability of the object corresponding to the one or more second objects included in the first object set, and to, when an object corresponding to the one or more second objects is not included in the first object set and included in the second object set, adjust upward a reliability of the object corresponding to the one or more second objects included in the second object set and adjust downward a reliability of at least one object included in the first object set.

The processor may be further configured to output an input request corresponding to the one or more second objects when there is no object corresponding to the one or more second objects among the one or more first objects.

The processor may be further configured to select one of a plurality of image segments of the image, based on a user reaction to the input request, to determine the one or more second objects as an object corresponding to the selected image segment, and to determine a reliability of the object corresponding to the selected image segment.

The processor may be further configured to adjust upward the reliability of the object corresponding to the selected image segment when there is the object corresponding to the selected image segment in the one or more first objects.

The processor may be further configured to display a corrected image which is corrected from the image, at least based on the image recognition scheme, to acquire another input associated with the displayed corrected image, and to adjust at least one reliability among the one or more reliabilities, based on the another input according to the character recognition scheme.

The processor may be further configured to, when the input includes a user utterance, convert the utterance into text as a part of the character recognition scheme, and to recognize the one or more words from the text.

The electronic device may further comprise a camera functionally connected to the processor, and the processor may be further configured to acquire a first image by using the camera, to generate a second image having a smaller size than a size of the first image by using the first image, and to transmit the second image to the external electronic device through the communication module such that the external electronic device recognizes the one or more first objects and the one or more reliabilities from the second image.

The electronic device may further comprise a microphone functionally connected to the processor, and the processor may be further configured to acquire a user input from the microphone, and to transmit the user input to the external electronic device through the communication module such that the external electronic device recognizes the one or more second objects from the user input.

The processor may be further configured to store the adjusted reliability together with the image in an image storage which is used in object recognition based on the image recognition scheme.

The electronic device may further comprise a camera functionally connected to the processor, and the processor may be further configured to acquire an image by using the camera, and to recognize the one or more first objects and the one or more reliabilities by using the acquired image.

According to various embodiments of the present disclosure, an electronic device may comprise a touch-sensitive display, an input device, a camera, a communication module, and a processor functionally connected to the touch-sensitive display, the input device, the camera, and the communication module. The processor may be configured to acquire a first image through the camera, to display a second image corresponding to the first image on the touch-sensitive display, to acquire a user input through at least one of the touch-sensitive display or the input device while the second image is displayed, to transmit the first image and the user input to the external electronic device through the communication module such that the external electronic device performs recognition of an object corresponding to the user input among objects of the first image, to receive a result of the recognition from the external electronic device, to acquire a first user reaction to the result through at least one of the touch-sensitive display or the input device, and to transmit the first reaction to the external electronic device through the communication module such that the external electronic device adjusts a reliability associated with the object recognition, based on the first reaction.

The processor may be further configured to receive, from the external electronic device through the communication module, a message indicating no object corresponding to the user input among objects of the first image or indicating a re-request of a user input, to acquire a second user reaction to the message through at least one of the touch-sensitive display or the input device, and to transmit the second reaction to the external electronic device through the communication module such that the external electronic device adjusts the reliability associated with the object recognition, based on the second reaction.

According to various embodiments of the present disclosure, a method of operating an electronic device may comprise identifying an image including one or more objects; acquiring one or more first objects corresponding to at least a part of the one or more objects and recognized at least based on an image recognition scheme, and one or more reliabilities associated with recognition of the one or more first objects; acquiring an input including information having one or more words associated with the image; acquiring one or more second objects corresponding to at least a part of the one or more words and recognized at least based on a character recognition scheme; when there is at least one object corresponding to the one or more second objects among the one or more first objects, adjust at least one reliability corresponding to the at least one object among the one or more reliabilities; and recognize the one or more first objects by using the image recognition scheme at least based on the one or more reliabilities including the adjusted at least one reliability.

While the present disclosure has been particularly shown and described with reference to exemplary embodiments thereof, it is clearly understood that the same is by way of illustration and example only and is not to be taken in conjunction with the present disclosure. It will be understood by those skilled in the art that various changes in form and details may be made therein without departing from the subject matter and scope of the present disclosure.

What is claimed is:

1. An electronic device comprising:
a processor configured to:
receive an image including one or more objects,
acquire a first one or more of the received one or more objects,
acquire one or more reliability measures associated with the acquired one or more first objects,
receive an input including information having one or more words,
acquire one or more second objects corresponding to at least a part of the one or more words,
determine, among the first objects, a first object set corresponding to a first priority and a second object set corresponding to a second priority lower than the first priority,
when there is at least one object corresponding to the one or more second objects among the one or more first objects, adjust at least one reliability measure corresponding to the at least one object among the acquired one or more reliability measures, including:
when an object corresponding to the one or more second objects is included in the first object set, adjust upward a reliability of the object corresponding to the one or more second objects included in the first object set, and
recognize the one or more first objects by using an image recognition scheme at least based on the one or more reliabilities including the adjusted at least one reliability.

2. The electronic device of claim 1, wherein the processor is further configured to adjust upward the at least one reliability measure.

3. The electronic device of claim 1, wherein adjusting the at least one reliability measure further comprises:
when the object corresponding to the one or more second objects is not included in the first object set and included in the second object set, adjust upward a reliability of the object corresponding to the one or more second objects included in the second object set and adjust downward a reliability of at least one object included in the first object set.

4. The electronic device of claim 1, wherein the processor is further configured to output an input request corresponding to the one or more second objects when there are no object corresponding to the one or more second objects among the one or more first objects.

5. The electronic device of claim 4, wherein the processor is further configured to:
select one of a plurality of image segments of the image, based on a user reaction to the input request,
determine the one or more second objects as an object corresponding to the selected image segment, and
determine a reliability of the object corresponding to the selected image segment.

6. The electronic device of claim 5, wherein the processor is further configured to adjust upward the reliability of the object corresponding to the selected image segment when there is the object corresponding to the selected image segment in the one or more first objects.

7. The electronic device of claim 1, wherein the processor is further configured to:
display a corrected image which is corrected from the image, at least based on the image recognition scheme,
acquire another input associated with the displayed corrected image, and
adjust at least one reliability among the one or more reliabilities, based on the another input.

8. The electronic device of claim 1, wherein the processor is further configured to, when the input includes a user utterance, convert the utterance into text, and to recognize the one or more words from the text.

9. The electronic device of claim 1, further comprising:
a camera functionally connected to the processor,
wherein the processor is further configured to:
acquire a first image by using the camera,
generate a second image having a smaller size than a size of the first image by using the first image, and
transmit the second image to an external electronic device through a communication module such that the external electronic device recognizes the one or more first objects and the one or more reliabilities from the second image.

10. The electronic device of claim 1, further comprising:
a microphone functionally connected to the processor,
wherein the processor is further configured to:
acquire a user input from the microphone, and
transmit the user input to an external electronic device through a communication module such that a external electronic device recognizes the one or more second objects from the user input.

11. The electronic device of claim 1, wherein the processor is further configured to store an adjusted reliability together with the image in an image storage which is used in object recognition based on the image recognition scheme.

12. The electronic device of claim 1, further comprising:
a camera functionally connected to the processor,
wherein the processor is further configured to:
acquire the image by using the camera, and
recognize the one or more first objects and the one or more reliabilities by using the acquired image.

13. An electronic device comprising:
a touch-sensitive display;
an input device;
a camera;
a communication module; and
a processor functionally connected to the touch-sensitive display, the input device, the camera, and the communication module,
wherein the processor is configured to:
acquire a first image through the camera,
display a second image corresponding to the first image on the touch-sensitive display,
acquire a user input through at least one of the touch-sensitive display or the input device while the second image is displayed,
transmit the first image and the user input to an external electronic device through the communication module such that the external electronic device performs recognition of an object corresponding to the user input among objects of the first image, including determining, among the first objects, a first object set corresponding to a first priority and a second object set corresponding to a second priority lower than the first priority,
receive a result of the recognition from the external electronic device,
acquire a first user input responsive to the result through at least one of the touch-sensitive display or the input device, and
transmit the first user input to the external electronic device through the communication module such that the external electronic device adjusts a reliability associated with the object recognition, based on the first user input, including: when an object corresponding to the one or more second objects is included in the first object set, adjusting upward a reliability of the object corresponding to the one or more second objects included in the first object set.

14. The electronic device of claim 13, wherein the processor is further configured to:
receive, from the external electronic device through the communication module, a message indicating no object corresponding to the user input among objects of the first image or indicating a re-request of a user input,
acquire a second user input responsive to the message through at least one of the touch-sensitive display or the input device, and
transmit the second user input to the external electronic device through the communication module such that the external electronic device adjusts the reliability associated with the object recognition, based on the second user input.

15. A method of operating an electronic device, the method comprising:
identifying an image including one or more objects;
acquiring one or more first objects corresponding to at least a part of the one or more objects, and one or more reliabilities associated with recognition of the one or more first objects;
acquiring an input including information having one or more words associated with the image;
acquiring one or more second objects corresponding to at least a part of the one or more words;
determining, among the first objects, a first object set corresponding to a first priority and a second object set corresponding to a second priority lower than the first priority;
when there is at least one object corresponding to the one or more second objects among the one or more first objects, adjust at least one reliability corresponding to the at least one object among the one or more reliabilities, including: when an object corresponding to the one or more second objects is included in the first object set, adjusting upward a reliability of the object corresponding to the one or more second objects included in the first object set; and
recognize the one or more first objects by using an image recognition scheme at least based on the one or more reliabilities including the adjusted at least one reliability.

* * * * *